US005940115A

United States Patent [19]

Nakamura et al.

[11] Patent Number: 5,940,115

[45] Date of Patent: Aug. 17, 1999

[54] METHOD OF IRRADIATING PHOTOSENSITIVE MATERIAL WITH A LASER BEAM OF A PARTICULAR TYPE

[75] Inventors: Masao Nakamura; Masahiro Hamasaki, both of Hino, Japan

[73] Assignee: Konica Corporation, Japan

[21] Appl. No.: 08/879,715

[22] Filed: Jun. 20, 1997

[30] Foreign Application Priority Data

Jun. 26, 1996 [JP] Japan .................................... 8-166034

[51] Int. Cl.$^6$ ............................... B41J 2/47; G01D 15/14

[52] U.S. Cl. ........................... 347/251; 347/252; 347/253

[58] Field of Search ..................................... 347/251, 252, 347/253, 254, 240, 131, 135; 358/296, 298, 521, 429, 456, 300; 430/363, 503, 506; 399/178, 181

[56] References Cited

U.S. PATENT DOCUMENTS

| | | | |
|---|---|---|---|
| 4,879,605 | 11/1989 | Warkentin et al. | 347/251 |
| 4,933,685 | 6/1990 | Asano et al. | 347/253 |
| 5,189,441 | 2/1993 | Fukui et al. | 347/253 |
| 5,559,585 | 9/1996 | Takagi | 347/253 |
| 5,686,953 | 11/1997 | Langmade et al. | 347/253 |

*Primary Examiner*—N. Le
*Assistant Examiner*—L. Anderson
*Attorney, Agent, or Firm*—Jordan B. Bierman; Bierman, Muserlian and Lucas

[57] ABSTRACT

Forming dots on a photosensitive material by irradiating the photosensitive material with a laser beam having a pulse width S (sec) and energy density E (w/cm$^2$), wherein the pulse width S and the energy density E are within the region bounded by the following formulas:

$$\log E = -0.46 \log S + 3.68$$

$$\log E = -0.46 \log S + 2.92$$

$$\log S = \log 3-5$$

$$\log S = \log 2-4$$

11 Claims, 6 Drawing Sheets

METHOD OF IRRADIATING PHOTOSENSITIVE MATERIAL WITH A LASER BEAM OF A PARTICULAR TYPE

BACKGROUND OF THE INVENTION

The present invention relates to a marking method of forming a mark on a photosensitive material in which the mark can be confirmed on an undeveloped state or developed state of the photosensitive material. Especially, the present invention relates to a marking method preferably usable to record a mark on a photosensitive film which is used for a hard copy apparatus such as a CT scanner by which accuracy image such as medical diagnosis images needing high flatness are formed on the photosensitive film.

Conventionally, when the name of a maker, a kind of a film, an effective usable period, a lot No. are marked on a photosensitive material such as a X-ray film, since it is necessary to confirm the marks on the undeveloped state of the photosensitive material due to the convenience on the handling, by pressing printing types onto the photosensitive material, fogs and deformation in the form of the printing types are caused by the pressure on the surface of the photosensitive material so that the marks are formed.

However, the abovementioned marking method with the use of the printing types has the following problems.

(1) Printing type exchange is necessary in the time of changing a marking pattern, exchange time is long, and it is difficult to conduct instant printing type exchange and to set the printing type in a production line.

(2) Adjustment of pressure balance between printing types by the height of each printing type is difficult and long time is needed for the adjustment. Further, sine it is necessary to conduct the adjustment work in a dark room, the working condition is very bad.

(3) The printing types are expensive and the appointed date of delivery is long. When the new kind of a photosensitive film is developed, preparation period is necessary.

(4) Since film base surface becomes uneven by the printing types, when an image is photographed, the image may become out of focus on the uneven film. Accordingly, it is difficult to conduct the printing types on an image recording film, especially, on a film used for a hard copy of a high precision image in a CT scanner. Because the film for CRT is required to have a high flatness.

Therefore, under the present situation, the marking is not conducted by the printing types for the film that high flatness is required. As a result, there is an inconvenience that it is difficult to identify the film. Further, in accordance with P.L. (production liability) law, it is necessary to conduct marking production information on a film. However, it is difficult to follow the P.L. law.

A mark is exposed on a film with a laser beam by a laser beam printer. In this case, the mark can not be visually confirmed before development.

Although a mark formed by thermal fog with laser beam is tried recently, there is a problem that when dust stick to the film surface, a spark occurs and harmful fog is caused in the vicinity of the mark on the film by the spark.

In order to solve such problems, the present inventors consider to conduct a marking by the use of dot printing type laser marker that can program printing pattern and examine its utility. As a result, the following problems has been found.

That is, as shown in a side view of FIG. 5, generally a polygon mirror 4 is used for scanning of laser beam. In this case, since a laser beam scans at high speed on a film, a dot of the laser beam is extended in a form of an oval in the main scanning direction as shown in FIGS. 6(*a*), 6(*b*) and 6(*c*). Accordingly, in a line component (vertical line) in the main scanning direction, dots are superimposed with each others and the laser beam irradiation time period on the superimposed portion is increased. As a result, since the density value of black on the line component in the main scanning direction becomes darker than that of the line component in the sub-scanning direction or the slanted line in which dots are not superimposed, density irregularities takes place on the marked character.

The increase of the laser beam irradiation time period by the partial superimposition among dots may have a risk to cause abnormal combustion when foreign material such as dust sticking on the film surface resides on the photosensitive film. In this case, spark generated by the abnormal combustion cause abnormal fog on the photosensitive film. In order to avoid the above problem, spacing means such as a skip font is tried to use so as to space between dots in the main scanning direction as shown in FIGS. 6(*d*), 6(*e*) and 6(*f*). However, the configuration of the character is not balanced.

SUMMARY OF THE INVENTION

An objective of the present invention is to provide a marking method of forming a mark or a character on a photosensitive material for recording a high precise image by the use of a dot type laser marker in order to solve the above problems.

The above objective is attained by one of the following methods (1) to (4).

(1) A marking method for a photosensitive material is characterized by driving a plurality of laser beam sources On or Off independently;

irradiating the photosensitive material with a laser beam from each laser beam source under a condition that relationship between energy density E (unit: w/$cm^2$) and a pulse width S (unit: seconds) locates within a region enclosed by formulas described below, whereby forming dots in a form of approximately circle with a predetermined interval.

$$\log E=k \log S+m_1$$

$$\log E=k \log S+m_2$$

$$\log S=\log 3\text{-}5$$

$$\log S=\log 2\text{-}4$$

wherein k=0.46

$m_1$=3.68 $m_2$=2.92

(2) A marking method for a photosensitive material is characterized by driving a plurality of laser beam sources On or Off independently;

irradiating the photosensitive material with a laser beam from each laser beam source under a condition that relationship between energy density E (unit: w/$cm^2$) and a pulse width S (unit: seconds) locates within a region enclosed by formulas described below, whereby forming dots in a form of approximately circle with a predetermined interval.

$$\log E = k \log S + m_3$$

$$\log E = k \log S + m_4$$

$$\log S = \log 3{-}5$$

$$\log S = \log 2{-}4$$

wherein k=0.46

$m_1$=3.23 $m_2$=3.11

(3) A marking method for a photosensitive material is characterized by driving a laser beam source On or Off independently;

irradiating the photosensitive material with a laser beam from the laser beam source under a condition that relationship between energy density E (unit: w/$cm^2$) and a pulse width S (unit: seconds) locates within a region enclosed by formulas described below, whereby forming dots in a form of approximately circle with a predetermined interval.

$$\log E = k \log S + m_1$$

$$\log E = k \log S + m_2$$

$$\log S = \log 3{-}5$$

$$\log S = \log 2{-}4$$

wherein k=0.46

$m_1$=3.68 $m_2$=2.92

(4) A marking method for a photosensitive material is characterized by driving a laser beam source On or Off independently;

irradiating the photosensitive material with a laser beam from the laser beam source under a condition that relationship between energy density E (unit: w/$cm^2$) and a pulse width S (unit: seconds) locates within a region enclosed by formulas described below, whereby forming dots in a form of approximately circle with a predetermined interval.

$$\log E = k \log S + m_1$$

$$\log E = k \log S + m_2$$

$$\log S = \log 3{-}5$$

$$\log S = \log 2{-}4$$

wherein k=0.46

$m_3$=3.23 $m_4$=3.11

DETAILED DESCRIPTION OF THE PREFERRED EMBODIMENTS

Figure 1:
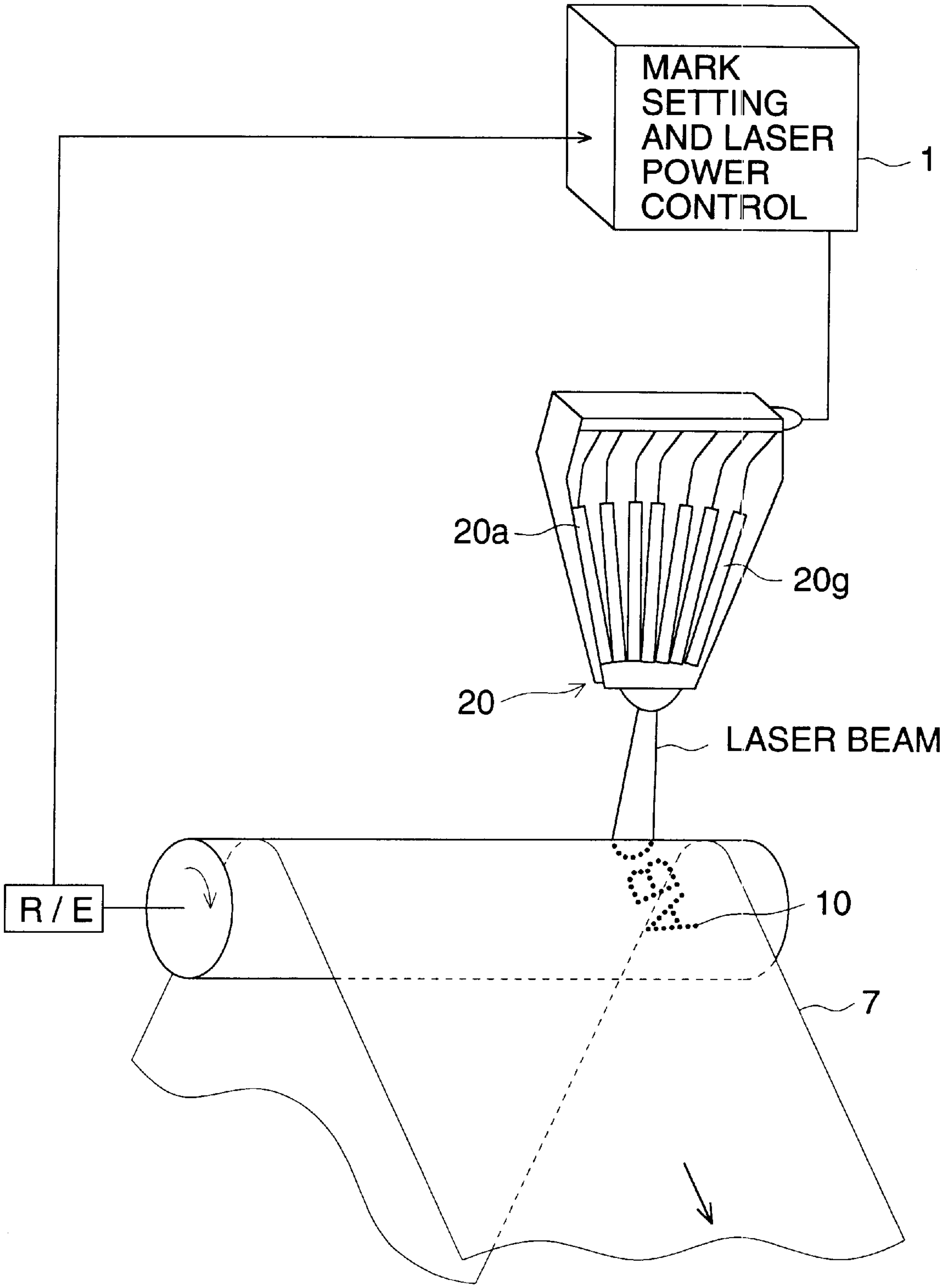
FIG. 1 is an illustration showing a structural example of a marking apparatus comprising a plurality of laser beam sources used for the marking method of the present invention.

A marking apparatus shown in FIG. 1 is provided with a printing head 20 comprising plural $CO_2$ gas seal type laser beam generating tubes 20*a* to 20*g* as a laser beam sources in a direction perpendicular to the film conveying direction. X-ray film 7 used as a photosensitive material is irradiated with laser beams from the laser beam generating tubes, whereby dot formation corresponding to the irradiated laser beams is conducted. The laser beam generating tubes are arranged such that dots are not superimposed when laser beams are generated. Dot formation in the film conveying direction is conducted in synchronization with encoder signals. The encoder signals are outputted from a rotary encoder R/E when a conveyed length of the film is longer than the diameter of dot. Peak wavelength of laser beam of CO2 gas laser of the present invention is 10600 nm.

Figure 2:
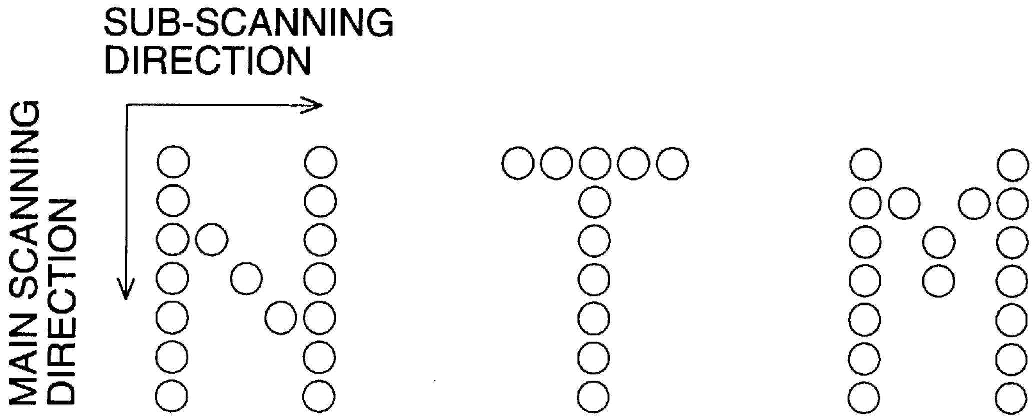
FIGS. 2(*a*), 2(*b*) and 2(*c*) are illustrations showing examples of character font formed by the use of the marking apparatus shown in FIG. 1.

In this case, since dots are not deformed and dot positions are predetermined, that is, the resolution of the formed character depends on the irradiated positions of laser beams, circular dots are formed with an even interval as exemplified in FIGS. 2(*a*) to 2(*c*). Further, since there is no superimposition among dots, the character is formed with even density value. Accordingly, since there is no need to use a skip font, a beautiful character in which dots are arranged so as to be balanced well can be formed.

However, if energy density E or pulse width S is excessively large, the surface of the X-ray film 7 is deformed or deteriorated, resulting in that image quality is lowered. Further, unnecessary combustion is apt to be caused by laser irradiation due to the surface condition of the X-ray film such as adhesion of a foreign material.

In contrast, if energy density E or pulse width S is excessively small, heat fog is reduced so that the density value of the formed character is too low to be recognized.

The present inventors conducted experiments and obtained the relation ship between energy density and pulse width of laser beams shown in Tables 1 to 7 with which the above problems can be avoided. In the experiments, a diameter of dot on the irradiated section was 0.2 mm and laser output of 40 (W) were used. Further, deformation on the film surface, fog caused by spark or combustion and the density of the formed character were evaluated visually. In Table, "A" represents the grade "excellent", that is, formed character is beautiful and excellent from a view of commercial value. "B" represents the grade "allowable" from the view of actual use. "C" represents the grade "slightly not preferable". And, "D"represents the grade "bad". From this evaluation, the inventor confirmed that proper region resides in the above relationship. In Tables 1 to 7, Konica X-ray film SR-H (orthochromatic type for direct photographing) which was coated with emulsion layer on its both sides was used as the photosensitive material. Irradiating with laser beam was conducted on the side of the film on which the emulsion layer was formed. Further, although test results are not described, Konica X-ray film New-A (regular type for direct photographing) which was coated with emulsion layer on its both sides was used and irradiating with laser beam was conducted on the side of the film on which the emulsion layer was formed. As a result, the same results were obtained. Incidentally, the photosensitive material of the orthochromatic type X-ray film has a spectral sensitivity in the range of 300 to 900 nm and a peak of spectral sensitivity in the range of wavelength of 400–600 nm. On the other hand, the photosensitive material of the regular type X-ray film has a peak of spectral sensitivity in the range of wavelength of 400–500 nm.

TABLE 1

Energy density E = 95 kw/$cm^2$

| Pulse width ($\mu$s) | Film surface deformation (Visual check) | Spark/ combustion/fog occurrence (Visual check) | Density level of formed character (Visual check) |
|---|---|---|---|
| 20 | B | B | D Light |
| 25 | B | B | C Slightly light |
| 30 | B | B | C Slightly light |
| 40 | B | B | B |
| 50 | B | B | B |
| 80 | B | B | A |
| 110 | B | B | A |
| 130 | B | B | A |
| 150 | B | B | A |
| 170 | B | B | A |
| 190 | B | B | A |
| 200 | B | B | B |
| 210 | C | C | C Slightly dark |
| 220 | D | D | C Slightly dark |
| 240 | D | D | D Dark |

TABLE 2

Energy density E = 150 kw/$cm^2$

| Pulse width ($\mu$s) | Film surface deformation (Visual check) | Spark/ combustion/fog occurrence (Visual check) | Density level of formed character (Visual check) |
|---|---|---|---|
| 20 | B | B | D Light |
| 25 | B | B | C Slightly light |
| 30 | B | B | B |
| 40 | B | B | A |
| 50 | B | B | A |
| 80 | B | B | B |
| 110 | B | B | B |
| 130 | B | B | B |
| 150 | B | B | B |
| 170 | B | B | B |
| 190 | B | B | B |
| 200 | B | B | B |
| 210 | C | C | C Slightly dark |
| 220 | D | D | C Slightly dark |
| 240 | D | D | D Dark |

TABLE 3

Pulse width W = 110 $\mu$s

| Energy density E (kw/$cm^2$) | Film surface deformation (Visual check) | Spark/ combustion/fog occurrence (Visual check) | Density level of formed character Undeveloped (Visual check) |
|---|---|---|---|
| 50 | B | B | C Slightly light |
| 55 | B | B | B |
| 60 | B | B | B |
| 80 | B | B | A |
| 100 | B | B | A |
| 150 | B | B | B |
| 200 | B | B | B |
| 250 | B | B | B |
| 280 | B | B | B |
| 300 | B | B | B |
| 320 | B | B | B |
| 340 | B | B | B |
| 360 | B | B | B |
| 380 | C | C | C Slightly dark |
| 400 | D | D | D Dark |

TABLE 4

Pulse width W = 130 $\mu$s

| Energy density E (kw/$cm^2$) | Film surface deformation (Visual check) | Spark/ combustion/fog occurrence (Visual check) | Density level of formed character (Visual check) |
|---|---|---|---|
| 45 | B | B | C Slightly light |
| 50 | B | B | B |
| 55 | B | B | B |
| 60 | B | B | A |
| 80 | B | B | A |
| 95 | B | B | A |
| 200 | B | B | B |
| 300 | B | B | B |
| 340 | B | B | B |
| 360 | C | C | C Slightly dark |
| 380 | D | D | D Dark |

TABLE 5

Pulse width W = 150 $\mu$s

| Energy density E (kw/$cm^2$) | Film surface deformation (Visual check) | Spark/ combustion/fog occurrence (Visual check) | Density level of formed character Undeveloped (Visual check) |
|---|---|---|---|
| 40 | B | B | D Light |
| 45 | B | B | C Slightly light |
| 48 | B | B | B |
| 50 | B | B | B |
| 60 | B | B | A |

TABLE 5-continued

Pulse width W = 150 μs

| Energy density E ($kw/cm^2$) | Film surface deformation (Visual check) | Spark/ combustion/fog occurrence (Visual check) | Density level of formed character Undeveloped (Visual check) |
|---|---|---|---|
| 80 | B | B | A |
| 95 | B | B | A |
| 150 | B | B | B |
| 200 | B | B | B |
| 300 | B | B | B |
| 320 | B | B | B |
| 330 | C | C | C Slightly dark |
| 340 | C | D | C Slightly dark |
| 350 | D | D | D Dark |

TABLE 6

Pulse width W = 200 μs

| Energy density E ($kw/cm^2$) | Film surface deformation (Visual check) | Spark/ combustion/fog occurrence (Visual check) | Density level of formed character (Visual check) |
|---|---|---|---|
| 38 | B | B | D Light |
| 40 | B | B | C Slightly light |
| 42 | B | B | B |
| 50 | B | B | B |
| 60 | B | B | A |
| 80 | B | B | A |
| 95 | B | B | A |
| 120 | B | B | B |
| 140 | B | B | B |
| 160 | B | B | B |
| 180 | B | B | B |
| 200 | B | B | B |
| 240 | B | B | B |
| 260 | B | B | B |
| 280 | B | B | B |
| 290 | C | C | C Slightly dark |
| 300 | D | D | D Dark |

TABLE 7

Pulse width W = 30 μs

| Energy density E ($kw/cm^2$) | Film surface deformation (Visual check) | Spark/ combustion/fog occurrence (Visual check) | Density level of formed character (Visual check) |
|---|---|---|---|
| 90 | B | B | D Light |
| 95 | B | B | C Slightly light |
| 100 | B | B | B |
| 150 | B | B | A |
| 200 | B | B | A |
| 300 | B | B | B |

TABLE 7-continued

Pulse width W = 30 μs

| Energy density E ($kw/cm^2$) | Film surface deformation (Visual check) | Spark/ combustion/fog occurrence (Visual check) | Density level of formed character (Visual check) |
|---|---|---|---|
| 400 | B | B | B |
| 500 | B | B | B |
| 690 | B | B | B |
| 700 | C | C | C Slightly dark |
| 720 | C | C | C Slightly dark |
| 750 | D | D | D Dark |

The above results are arranged so as to be shown in a graph. As a result, the following is obtained.

Figure 3:
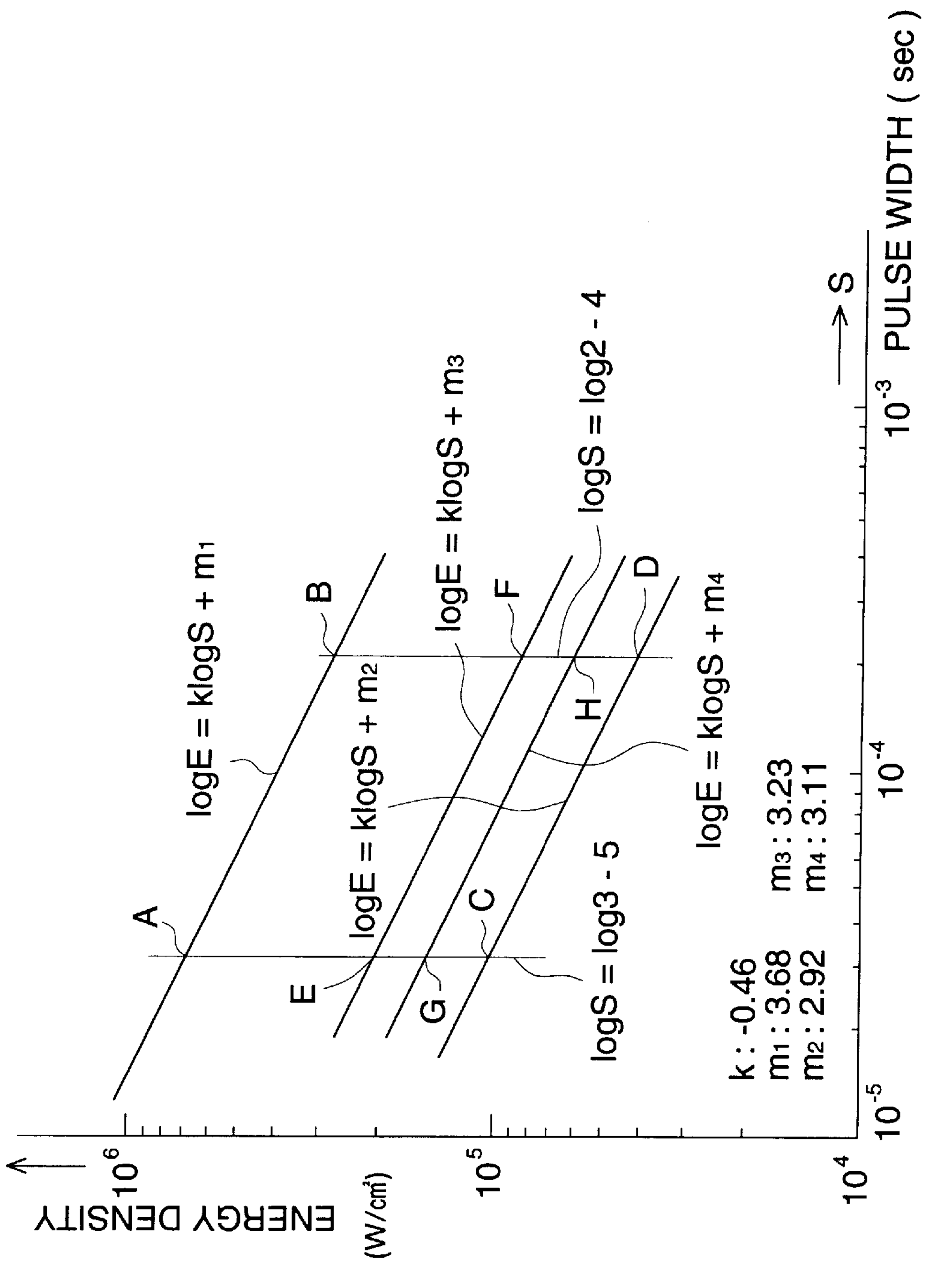
FIG. 3 is a graph showing optimum marking region in the relationship between energy density and pulse width of a laser beam.

That is, as shown in a log-log graph in FIG. 3 in which the axis of abscissas represents pulse width (sec) and the axis of ordinates represents energy density E ($w/cm^2$), on the right side of the vertical line connecting a point B and a point D in the section upper than the line connecting a point A and a point B, the density level of the character formed by the laser beam was too dark and the deformation was observed on the film surface so that the influence causing the image quality in an imaging section to be lowered was observed. Further, a sign of combustion on the surface was slightly observed.

On the left side of the vertical line connecting a point A and a point C in the section lower than the line connecting a point C and a point D, the density level of the character formed by the laser beam was too light so that it was difficult to read the character.

In contrast, in the region enclosed by the above four lines, it was easy to read the character and, of course, no deformation and no deterioration were observed on the film surface. Accordingly, it was confirmed that excellent character with which image quality is not lowered can be obtained.

In the above region, in particular, in the region lower than the line connecting a point E and a point F and upper than the line connecting a point G and a point H, it was observed that the density level of the formed character is very beautiful and the commercial value is high.

If the above lines are represented by formulas, the formulas become as shown in FIG. 3.

Figure 4:
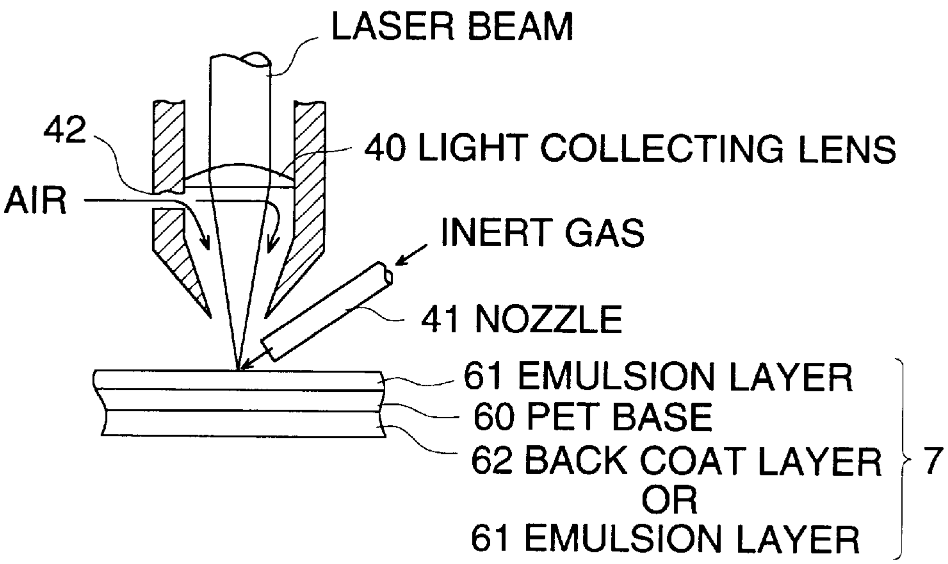
FIGS. 4(*a*) and 4(*b*) are sectional views showing an inert gas blowing means to avoid excessive heat fog or combustion caused by laser beam.
Figure 4:
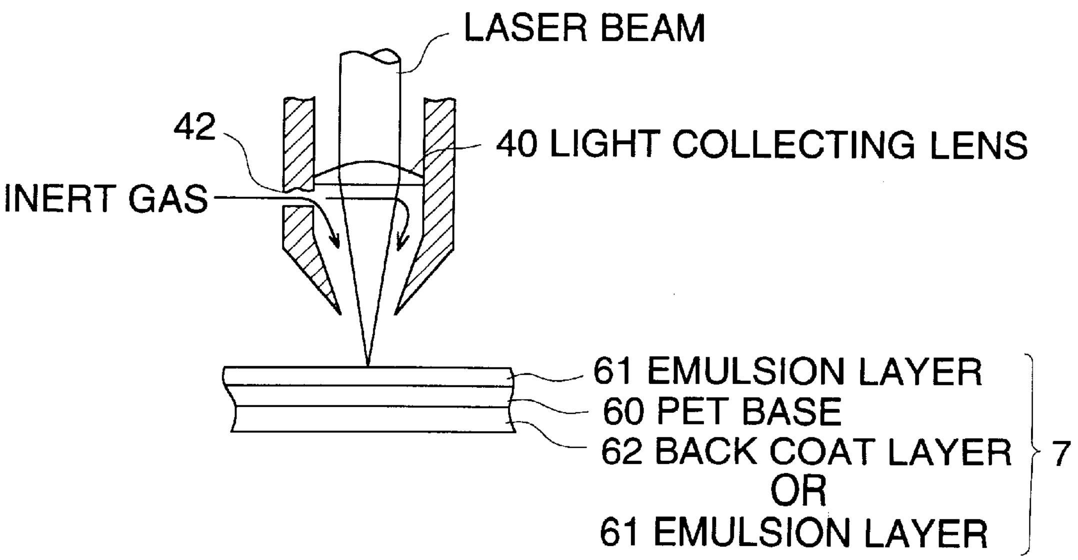
Figure 5:
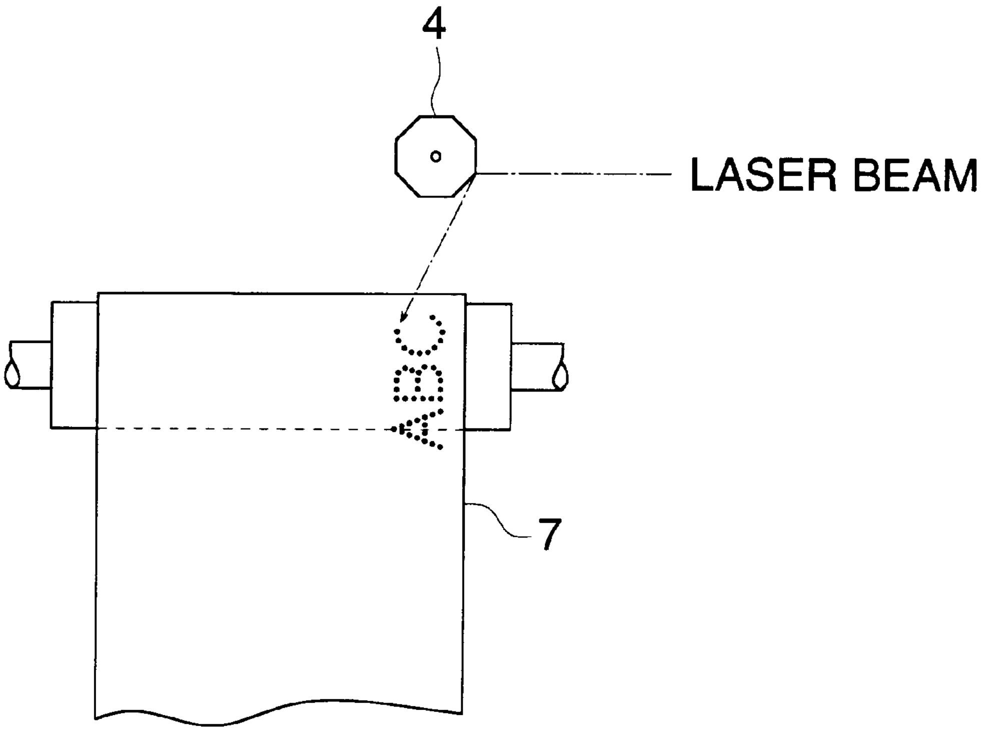
FIG. 5 is an illustration showing a marking apparatus conducting marking with main scanning by a single laser beam.
Figure 6:
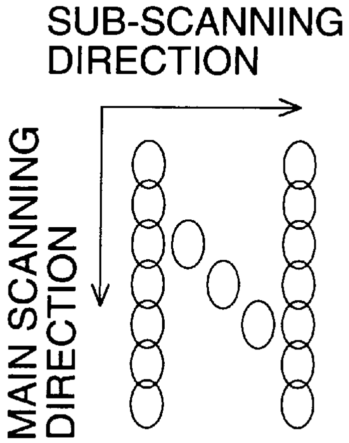
FIGS. 6(*a*), 6(*b*) and 6(*c*) are illustrations showing dots superimposed in the main scanning direction, and FIGS. 6(*d*), 6(*e*) and 6(*f*) are illustrations showing dots of skip font in which a dot between dots is eliminated so as to avoid the superimposition.
Figure 6:
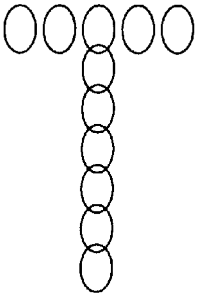
Figure 6:
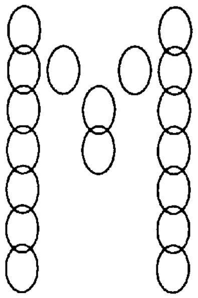
Figure 6:
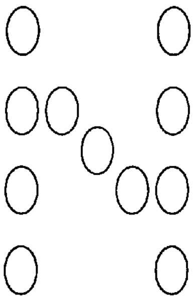
Figure 6:
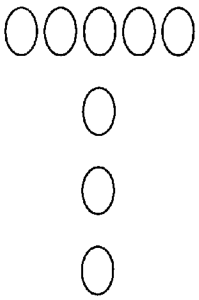
Figure 6:
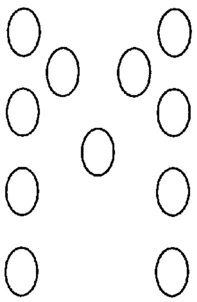

By the use of means for regulating laser beam so as to locate in the above region, it become not necessary to avoid combustion by blowing inert gas as shown in FIGS. 4(*a*) and 4(*b*) which the present inventors tried before in order to avoid unnecessary combustion by laser beam irradiation due to the surface condition of X-ray film such as adhesion of foreign materials.

In FIG. 4(*a*), nozzle 41 is used to blow inert gas. In FIG. 4(*b*), opening section 42 which is originally provided to blow air to avoid adhesion of foreign materials on a light collecting lens is diverted to blow inert gas. In the present invention, it is not necessary to use such a complicated device to blow inert gas.

With the above manner, in the present invention, the scanning in the main scanning direction with laser beam from a single laser beam is not conducted. Instead, with light source comprising a plurality of laser generating tubes corresponding in number to the dots to be formed in the direction perpendicular to the film conveying direction, by forming dots at predetermined positions in the main scanning direction by driving the plurality of laser generating tubes On or Off, each dot becomes the same circle and it becomes possible to form dots regularly with even interval. As a result, there is no fear that dots are partially superimposed in the case of scanning with a laser beam from a single light source. Further, with the technique of the present invention, in addition to heat fog on emulsion layer 61 on the surface of the photosensitive material, a proper degree of deformation (concave and convex which do not affect the flatness of the film base surface) are formed by the sublimation of emulsion layer 61 coated on PET base 60 so that character or mark having even density level can be formed and the character or the mark can be identified before and after the photosensitive material is developed.

Namely, by regulating the pulse width and the energy density of the laser beam so as to locate in the region of the present invention shown in FIG. 3, the deformation in the character and the marking is conducted to an extent that the flatness of the film is not affected, the combustion is not caused, and the formed character and mark can be easily read.

The embodiment mentioned above corresponds to the methods (1) and (2). As embodiments corresponding to methods (3) and (4), in the case that only a simple mark is formed by the marking without forming characters, by regulating the energy density and the pulse width of a laser beam from a singe laser beam source so as to locate in the region shown in FIG. 3 as same as the embodiments of the methods (1) and (2), it becomes possible to form an excellent mark.

With the technique of the present invention, characters or marks can be formed with even dots of laser beams without causing deformation or deterioration on imaging surface of X-ray film used as a photosensitive material. Further, a marking method of forming characters or marks safely clearly can be established without causing spark or combustion. Furthermore, the marking method by which characters or marks capable of being identified on undeveloped condition can be formed on a film for forming a high precise image can be conducted simply easily and nicely.

What is claimed is:

1. A method of forming dots on a photosensitive material, comprising:

irradiating said photosensitive material with a laser beam having a pulse width S (sec) and energy density E ($w/cm^2$), wherein said pulse width S and said energy density E are within a region enclosed by the following formulas:

$$\log E=-0.46\log S+3.68$$

$$\log E=-0.46\log S+2.92$$

$$\log S=\log 3-5$$

$$\log S=\log 2-4$$

2. The method of claim 1 wherein said pulse width S and said energy density E are within a region enclosed by the following formulas:

$$\log E=-0.46\log S+3.23$$

$$\log E=-0.46\log S+3.11$$

$$\log S=\log 3-5$$

$$\log S=\log 2-4$$

3. The method of claim 1 wherein a peak wavelength of said laser beam is outside a wavelength region in which said photosensitive material has spectral sensitivity.

4. The method of claim 3, wherein the laser beam is a laser beam from a carbonic acid gas laser.

5. The method of claim 4, wherein a peak wavelength of the laser beam is 10600 nm.

6. The method of claim 3, wherein the photosensitive material has spectral sensitivity in 300 to 900 nm.

7. The method of claim 6, wherein the photosensitive material is a photosensitive material for X-ray.

8. The method of claim 3, wherein the photosensitive material has a peak of spectral sensitivity in wavelength of 400 nm to 600 nm.

9. The method of claim 8, wherein the photosensitive material is an orthochromatic type photosensitive material for X-ray.

10. The method of claim 3, wherein the photosensitive material has a peak of spectral sensitivity in wavelength of 400 nm to 500 nm.

11. The method of claim 10, wherein the photosensitive material is a regular type photosensitive material for X-ray.

* * * * *